US012709208B2

(12) United States Patent
Neff

(10) Patent No.: US 12,709,208 B2
(45) Date of Patent: Aug. 18, 2026

(54) HAND HOLD APPARATUS

(71) Applicant: Garry D. Neff, Lakewood, CO (US)

(72) Inventor: Garry D. Neff, Lakewood, CO (US)

( * ) Notice: Subject to any disclaimer, the term of this patent is extended or adjusted under 35 U.S.C. 154(b) by 352 days.

(21) Appl. No.: 18/384,857

(22) Filed: Oct. 29, 2023

(65) Prior Publication Data

US 2024/0190322 A1 Jun. 13, 2024

Related U.S. Application Data

(60) Provisional application No. 63/431,033, filed on Dec. 8, 2022.

(51) Int. Cl.
*B60N 3/02* (2006.01)

(52) U.S. Cl.
CPC ............. *B60N 3/026* (2013.01); *B60N 3/023* (2013.01)

(58) Field of Classification Search
CPC ................................ B60N 3/023; B60N 3/026
USPC ........................................................ 296/1.02
See application file for complete search history.

(56) References Cited

U.S. PATENT DOCUMENTS 4,074,379 A * 2/1978 Grossman ............... B63B 17/04 114/364
4,203,291 A * 5/1980 Youngers ................. G05G 5/18 74/471 R
4,231,606 A * 11/1980 Tuerk ..................... B62D 33/08 280/143
4,626,016 A * 12/1986 Bergsten .................. B60N 3/02 105/354
6,116,378 A * 9/2000 Barrow ..................... B60R 3/02 182/95
8,251,423 B1 * 8/2012 Lingle ....................... B60R 3/00 296/1.02
8,393,657 B1 * 3/2013 Duderstadt ............ B60N 3/023 296/43
8,678,457 B1 * 3/2014 Duderstadt ............... B60R 3/00 296/1.02
8,794,660 B1 * 8/2014 Stover .................. A01D 34/001 280/727
8,919,853 B2 * 12/2014 Krishnan .................. B60R 3/02 296/62
9,022,445 B1 * 5/2015 Duderstadt ............ B60N 3/023 296/183.1
9,517,711 B2 * 12/2016 Krajenke ............... B60N 3/023
9,649,965 B1 * 5/2017 Burkhardt .............. B60N 3/023
10,023,247 B2 * 7/2018 Diller ................. B62D 33/0207

(Continued)

*Primary Examiner* — Jason S Morrow
(74) *Attorney, Agent, or Firm* — Roger A. Jackson

(57) ABSTRACT

A hand hold apparatus for manually grasping by a user for support in a truck bed wherein the truck bed has a protrusion, the hand hold apparatus including a first surrounding sidewall including a first outer surface and a first inner surface, further the first surrounding sidewall having a first proximal end portion and a first distal end portion. Further included in the hand hold apparatus is a second surrounding sidewall including an second outer surface and a second inner surface, further the second surrounding sidewall having a second proximal end portion and a second distal end portion, the first outer surface has a slidable engagement with the second inner surface with a portion of the first surrounding sidewall first outer surface of the first distal end portion telescopically projecting in a cantilever manner a distance beyond the second proximal end portion to form a hand hold.

7 Claims, 16 Drawing Sheets

(56) References Cited

U.S. PATENT DOCUMENTS

| | | | | |
|---|---|---|---|---|
| 10,173,595 | B1 * | 1/2019 | Ulrich | B60R 3/02 |
| 10,384,582 | B2 * | 8/2019 | Parker | B60P 7/0807 |
| 10,533,374 | B2 * | 1/2020 | Jevaney | E06C 5/36 |
| 10,703,286 | B2 * | 7/2020 | Patterson | B62D 33/0273 |
| 10,829,022 | B2 * | 11/2020 | Patterson | B60R 3/02 |
| 11,584,283 | B2 * | 2/2023 | Yun | B60N 3/026 |
| 11,993,189 | B2 * | 5/2024 | Myers | B60N 3/026 |
| 12,485,830 | B2 * | 12/2025 | Dexter | B60R 9/06 |
| 12,491,810 | B2 * | 12/2025 | Ramaswami | B60N 3/02 |
| 2017/0320419 | A1 * | 11/2017 | Gobart | B60N 3/02 |

* cited by examiner

HAND HOLD APPARATUS

RELATED APPLICATION

This application claims the benefit of U.S. provisional patent application Ser. No. 63/431,033 filed on Dec. 8, 2022, by Garry D. Neff of Lakewood, Colorado, U.S.

FIELD OF THE INVENTION

The present invention generally relates to hand holds. More particularly, the present invention is used with a truck bed to form a hand hold for a user to step up to the truck bed and for the user to step down from the truck bed the ground surface from the truck bed for stability.

DESCRIPTION OF THE RELATED ART

In U.S. Pat. No. 4,231,606 to Tuerk, disclosed is a pickup truck stake arrangement that is constructed of delta stakes that enclose a truck bed utilizing the stake pockets in the truck bed with the delta stakes having tapered bottoms to removably seat within the stake pockets. Wall enclosure panels in Tuerk are accommodated by dove tail ridges with brackets. Tuerk operationally holds cargo in the pickup truck bed above the normal sidewalls.

Further, in U.S. Pat. No. 10,023,247 to Diller, disclosed is a stake pocket anchor that sandwiches a center block having outward anchors that grip the lip of the stake pocket. The anchors in Diller are moved inward and outward by angled slots pinned to the center block.

Continuing, in U.S. Pat. No. 10,384,582 to Parker, disclosed is a truck bed handle apparatus that is in a fixed vertical positional orientation as being partially inserted into a truck bed stake pocket opening down to a flange with the actual handle protruding above the truck bed wall in a fixed vertical distance manner, there is no teaching as to affixing the handle firmly to the truck bed, just a bounce out retainer bolt 91.

The advantage of the present invention is to make the handle removable when it is not needed to not be in the way of truck bed cargo or get lost.

Description of the Present Invention Needs

Open truck beds are usually quite high from the ground surface and require the user to find a small ladder or step stool to step up to the truck bed from the ground surface, however, even with the ladder or step stool it would be helpful for the user to have a hand hold to stabilize themselves laterally in stepping up to the truck bed from the ground surface and in a reverse manner to step down from the truck bed to the ground surface. Plus, to have the further advantage of the handle being removable when not in use to prevent it from getting lost or being in the way of the truck bed cargo.

SUMMARY OF INVENTION

Broadly, the present invention is a hand hold apparatus for manually grasping by a user for support in a truck bed wherein the truck bed has a protrusion, the hand hold apparatus including a first surrounding sidewall including a first outer surface and an opposing first inner surface, further the first surrounding sidewall having a first proximal end portion and an opposing first distal end portion with a first longitudinal axis spanning therebetween.

Further included in the hand hold apparatus is a second surrounding sidewall including a second outer surface and an opposing second inner surface, further the second surrounding sidewall having a second proximal end portion and an opposing second distal end portion with a second longwise axis spanning therebetween. Wherein the first longitudinal axis and the second longwise axis are coincident to one another, and the first outer surface has a partial slidable engagement with the second inner surface being along both the first longitudinal axis and the second longwise axis with a portion of the first surrounding sidewall first outer surface of the first distal end portion telescopically projecting in a cantilever manner a distance beyond the second proximal end portion.

In addition, the hand hold apparatus includes a first planar flange element with a first outer periphery, the first planar element having a first plane, the first planar element is affixed to the second proximal end portion such that the first plane and the second longwise axis are perpendicular to one another. A second planar flange element with a second outer periphery, wherein the second outer periphery is less than the first outer periphery and a means for removably engageable fastening between the first and second planar flange elements, wherein operationally the first and second planar flange elements clamp upon the truck bed protrusion via the means for removably engageable fastening such that the first and second flange elements clamp on the truck bed protrusion that secures the first and second surrounding sidewalls to the truck bed.

These and other objects of the present invention will become more readily appreciated and understood from a consideration of the following detailed description of the exemplary embodiments of the present invention when taken together with the accompanying drawings, in which;

REFERENCE NUMBERS IN DRAWINGS

Figure 1:
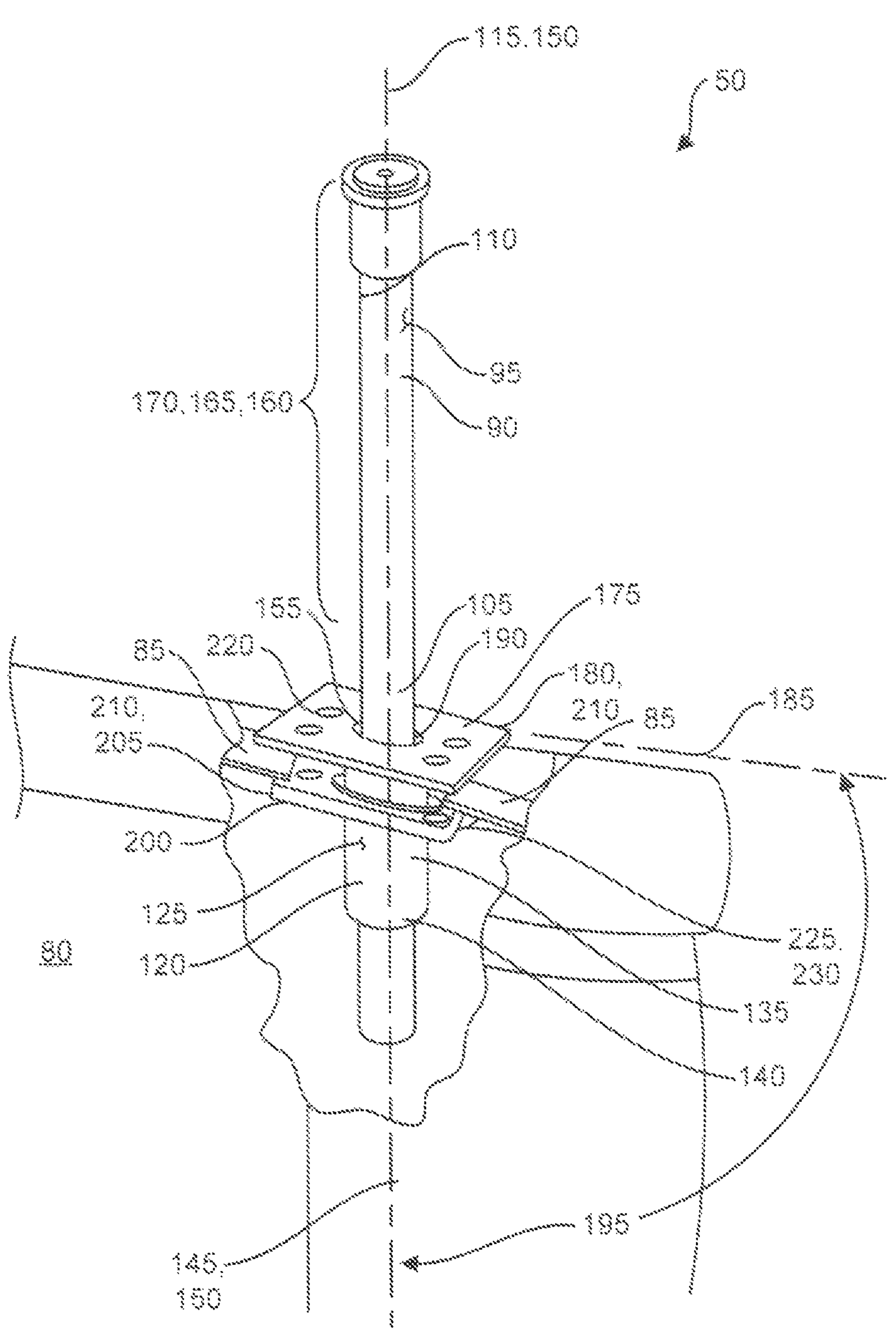
FIG. 1 shows an upper perspective view of the hand hold apparatus with the first and second surrounding sidewalls with the first surrounding sidewall slidably engaged within the second surrounding sidewall along with the first and second planar flange elements sandwiching the truck bed protrusion.

50 Hand hold apparatus
55 User
60 Hand of user 55
65 Arm of user 55
70 Leg of user 55
75 Support of user 55
80 Truck bed
85 Protrusion in the truck bed 80
90 First surrounding sidewall
95 First outer surface of the first surrounding sidewall 90
100 First inner surface of the first surrounding sidewall 90
105 First proximal end portion of the first surrounding sidewall 90
110 First distal end portion of the first surrounding sidewall 90
115 First longitudinal axis of the first surrounding sidewall 90
120 Second surrounding sidewall
125 Second outer surface of the second surrounding sidewall 120
130 Second inner surface of the second surrounding sidewall 120
135 Second proximal end portion of the second surrounding sidewall 120
140 Second distal end portion of the second surrounding sidewall 120
145 Second longwise axis of the second surrounding sidewall 120
150 Coincident position of the second longwise axis 145 and the first longwise axis 115
155 Partial slidable engagement between the first outer surface 95 and the second inner surface 130
160 Telescoping projection
165 Cantilever manner
170 Portion of the first distal end portion 110 of the first surrounding sidewall 90 having the telescoping projection 160 in the cantilever manner 165
175 First planar flange element
180 First outer periphery of the first planar flange element 175
185 First plane of the first planar flange element 175
190 Affixed nature of the first planar flange element 175 to the second proximal end portion 135
195 Perpendicular position of the first plane 185 to the second longwise axis 145

200 Second planar flange element

205 Second outer periphery of the second planar flange element 200

210 Second outer periphery 205 less than the first outer periphery 180

220 Plurality of threaded fasteners that are received therein removably engageable fastening between the first 175 and second 200 planar flange elements

225 Clamp of the first 175 and second 200 planar flange elements on the protrusion 85 via the plurality of threaded fasteners that are received therein removably engageable fastening 220

230 Securing the first 90 and second 120 surrounding sidewalls to the truck bed 80 via the clamp 225

235 Base

240 Affixed base to the second distal end portion 140

250 Interior of the second surrounding sidewall 120

255 Stop of the base 235 for the first surrounding sidewall 90 along the first longitudinal axis 115 and the second longwise axis 145 for the partial slidable engagement 155

260 Pin

265 Stop cushion element of the pin 260 for the first surrounding sidewall 90 along the first longitudinal axis 115 and the second longwise axis 145 for the partial slidable engagement 155

270 Aperture for pin 260

275 Interface of the truck bed 80 to the first outer periphery 180

280 Dimple indentation

285 Dimple protrusion

290 Interface interference as between the dimple protrusion 285 and the stop cushion 265 to provide a stop for the partial slidable engagement 155 of the first surrounding sidewall 90 in a direction opposite from the first distal end portion 110 of the first surrounding sidewall 90;

DETAILED DESCRIPTION

With initial reference to FIG. 1 shown is an upper perspective view of the hand hold apparatus 50 with a first 90 and second 120 surrounding sidewalls with the first surrounding sidewall 90 slidably engaged 155 within the second surrounding sidewall 120 along with the first 175 and second 200 planar flange elements sandwiching the truck bed 80.

Figure 2:
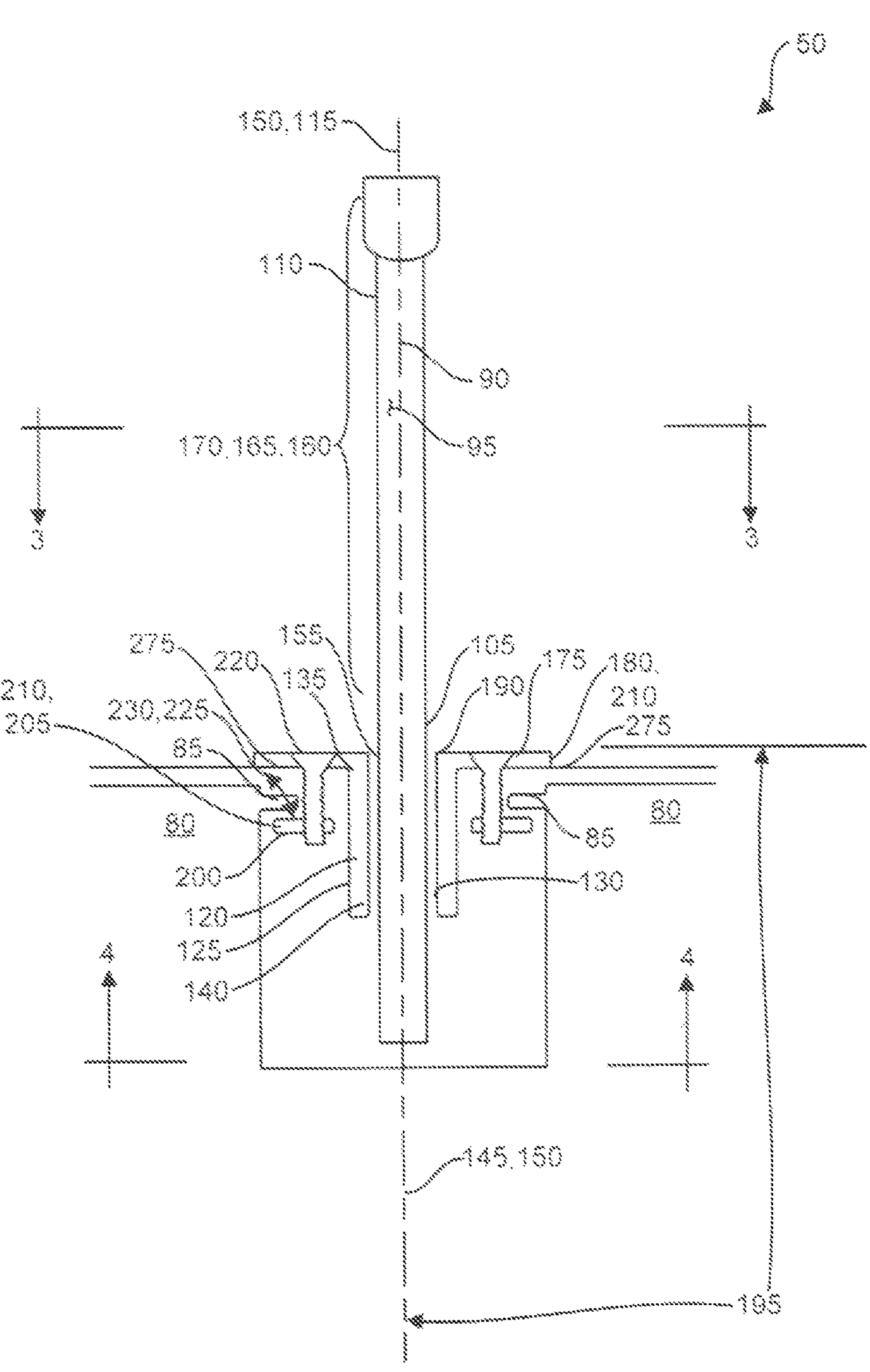
FIG. 2 shows a side elevation view of the hand hold apparatus with the first and second surrounding sidewalls with the first surrounding sidewall slidably engaged within the second surrounding sidewall along with the first and second planar flange elements sandwiching the truck bed protrusion.

FIG. 2 shows a side elevation view of the hand hold apparatus 50 with the first 90 and second 120 surrounding sidewalls with the first surrounding sidewall 90 slidably engaged 155 within the second surrounding sidewall 120 along with the first 175 and second 200 planar flange elements sandwiching the truck bed 80.

Figure 3:
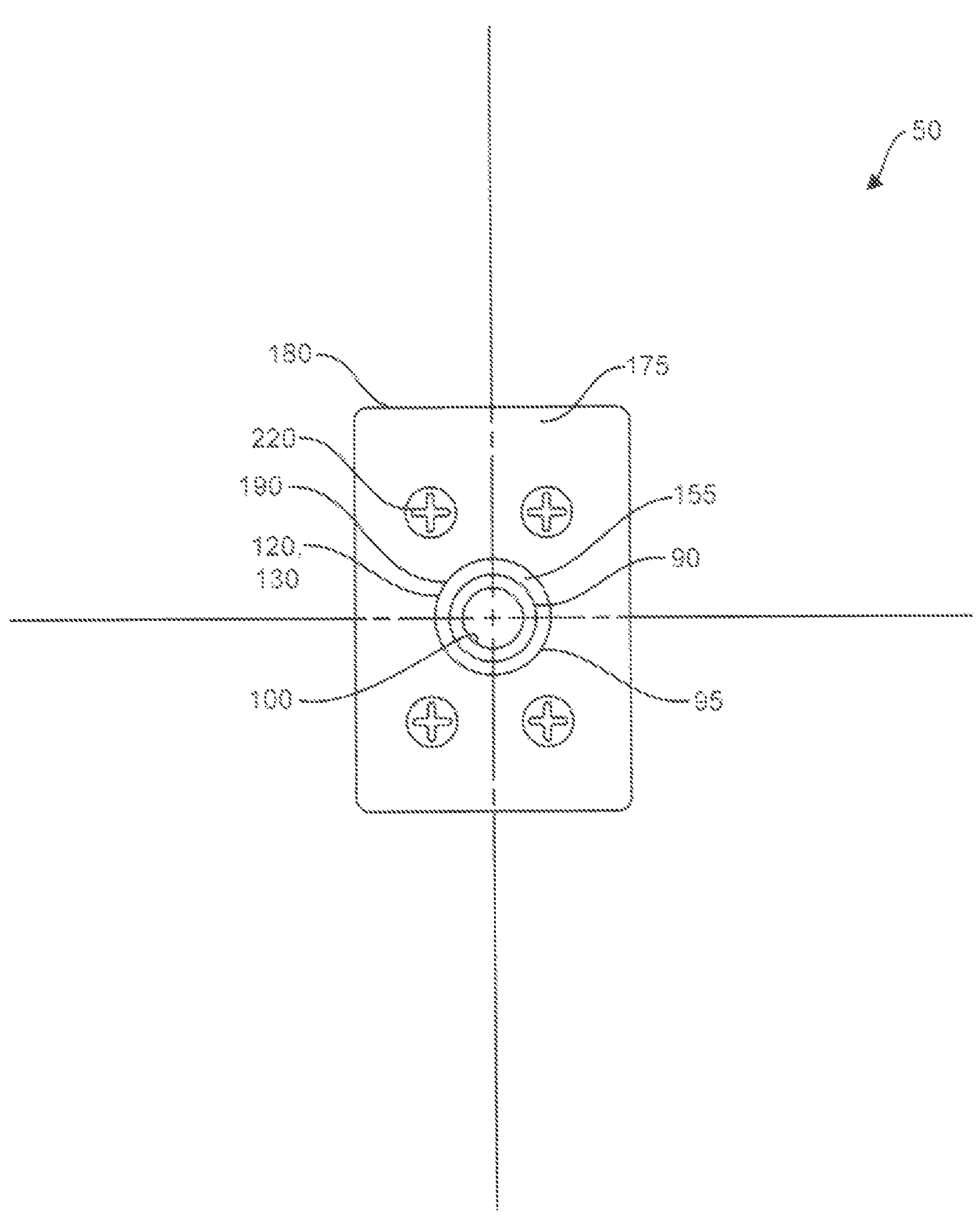
FIG. 3 shows a top view of the hand hold apparatus with the first and second surrounding sidewalls with the first surrounding sidewall slidably engaged within the second surrounding sidewall along with the first planar flange element.

FIG. 3 shows a top view of the hand hold apparatus 50 with the first 90 and second 120 surrounding sidewalls with the first surrounding sidewall 90 slidably engaged 155 within the second surrounding sidewall 120 along with the first planar flange element 175.

Figure 4:
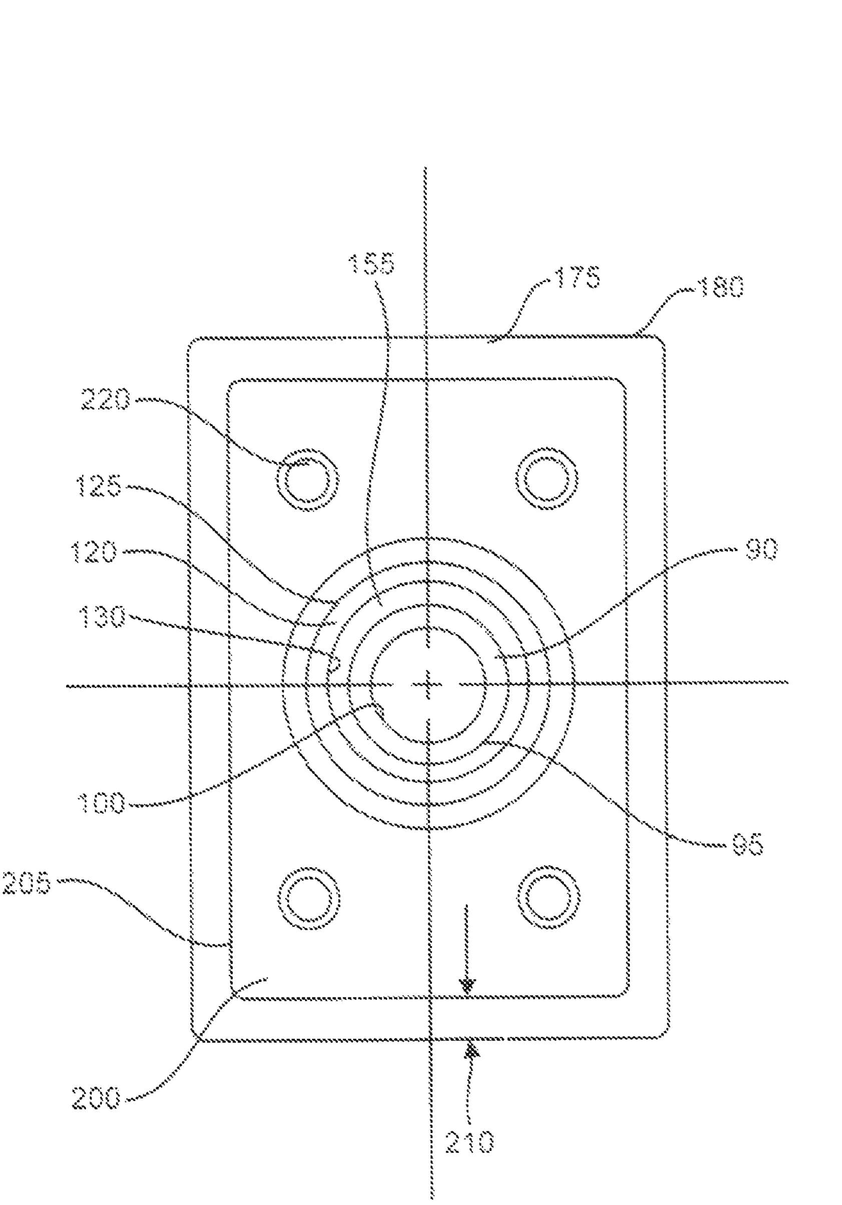
FIG. 4 shows a bottom view of the hand hold apparatus with the first and second surrounding sidewalls with the first surrounding sidewall slidably engaged within the second surrounding sidewall along with the first and second planar flange elements.

FIG. 4 shows a bottom view of the hand hold apparatus 50 with the first 90 and second 120 surrounding sidewalls with the first surrounding sidewall 90 slidably engaged 155 within the second surrounding sidewall 120 along with the first 175 and second 200 planar flange elements.

Figure 5:
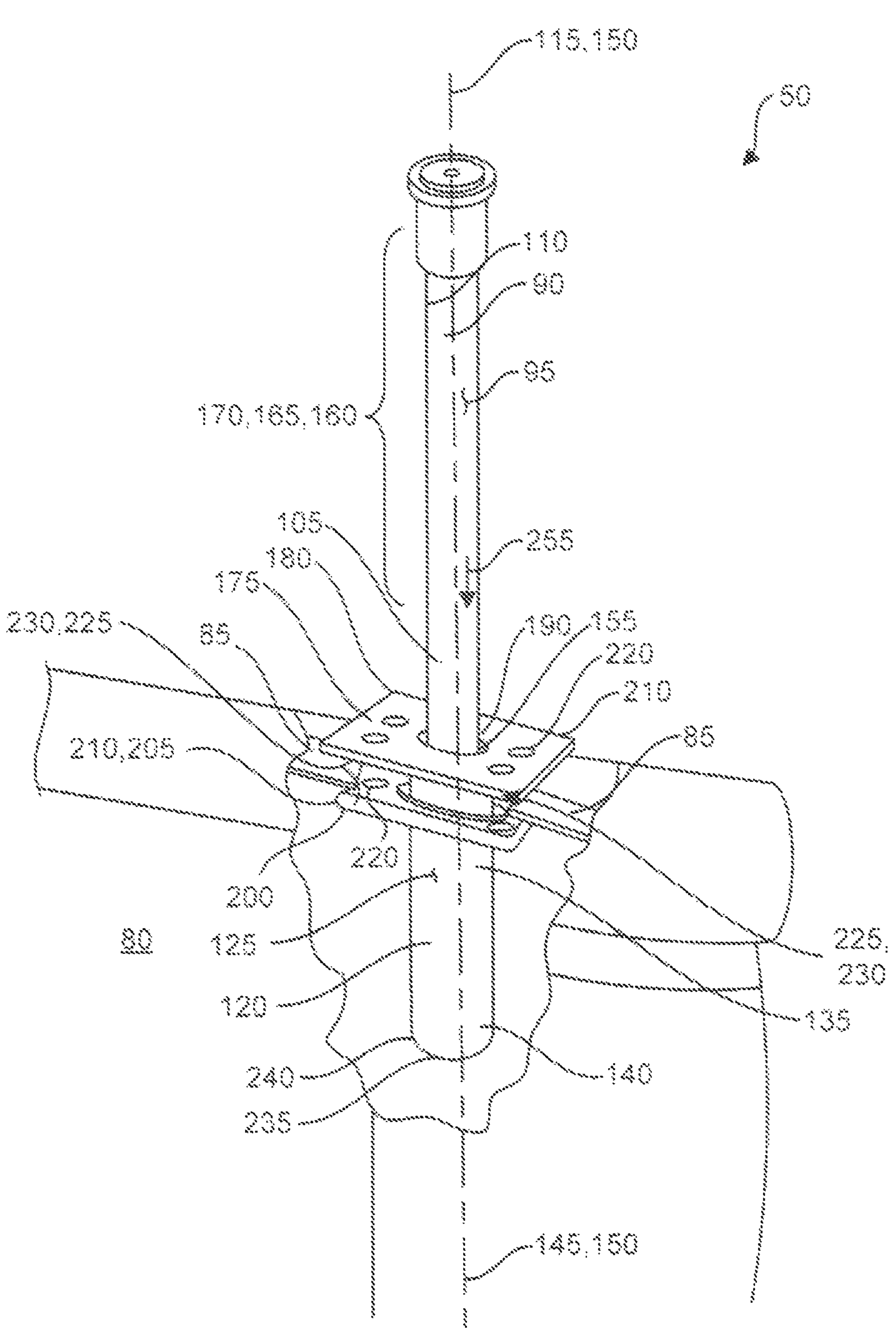
FIG. 5 shows an upper perspective view of the hand hold apparatus with the first and second surrounding sidewalls with the first surrounding sidewall slidably engaged within the second surrounding sidewall along with the first and second planar flange elements sandwiching the truck bed protrusion, further shown is the base that is affixed to the second distal end portion.

FIG. 5 shows an upper perspective view of the hand hold apparatus 50 with the first 90 and second 120 surrounding sidewalls with the first surrounding sidewall 90 slidably engaged 155 within the second surrounding sidewall 120 along with the first 175 and second 200 planar flange elements sandwiching the truck bed 80, further shown is the base 235 that is affixed 240 to the second distal end portion 140.

Figure 6:
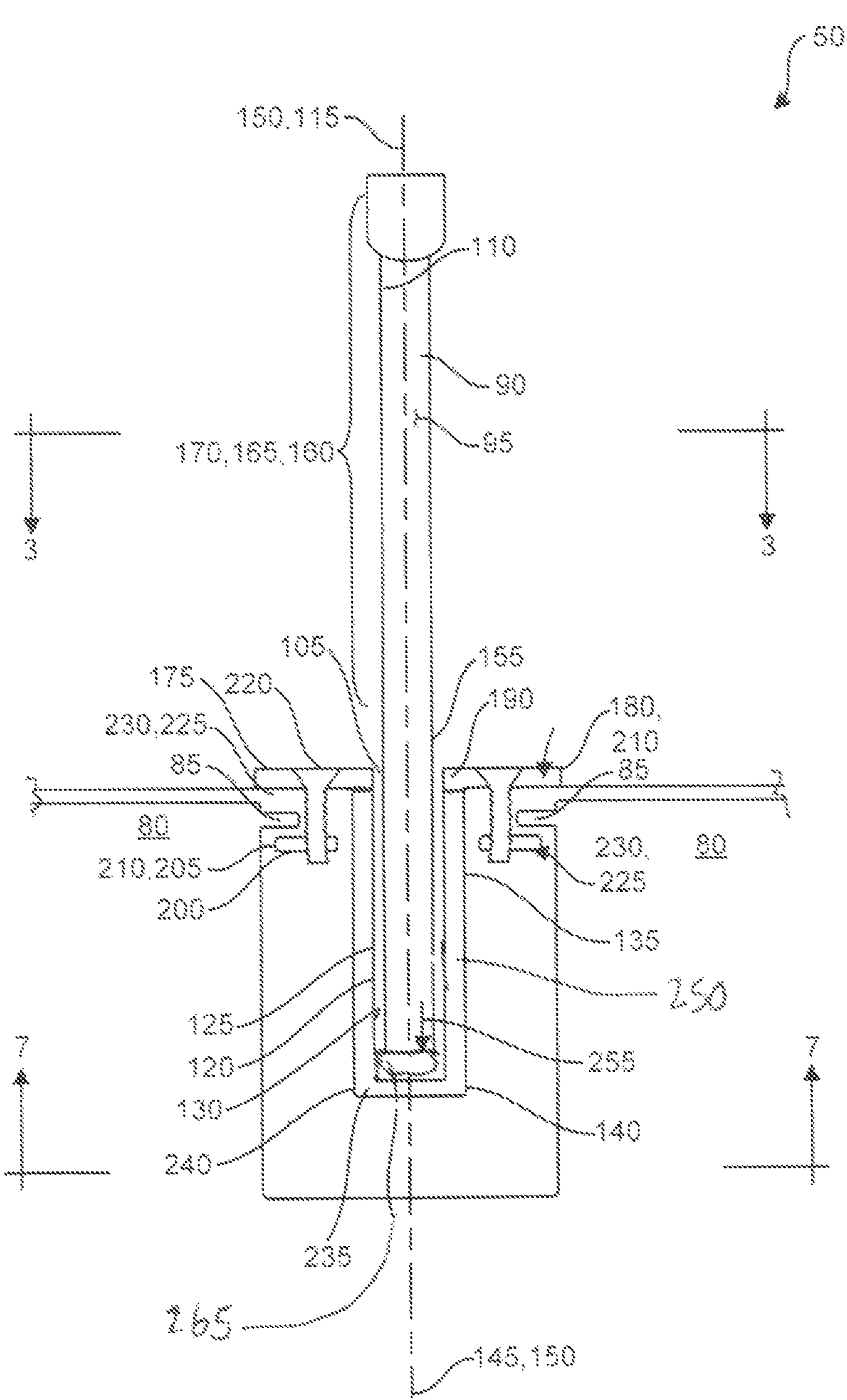
FIG. 6 shows a side elevation view of the hand hold apparatus with the first and second surrounding sidewalls with the first surrounding sidewall slidably engaged within the second surrounding sidewall along with the first and second planar flange elements sandwiching the truck bed protrusion, further shown is the base that is affixed to the second distal end portion, wherein the base provides a stop for the partial slidable engagement of the first surrounding sidewall.

FIG. 6 shows a side elevation view of the hand hold apparatus 50 with the first 90 and second 120 surrounding sidewalls with the first surrounding sidewall 90 slidably engaged 155 within the second surrounding sidewall 120 along with the first 175 and second 200 planar flange elements sandwiching the truck bed 80, further shown is the base 235 that is affixed 240 to the second distal end portion 140, wherein the base 235 provides a stop 255 for the partial slidable engagement 155 of the first surrounding sidewall 90.

Figure 7:
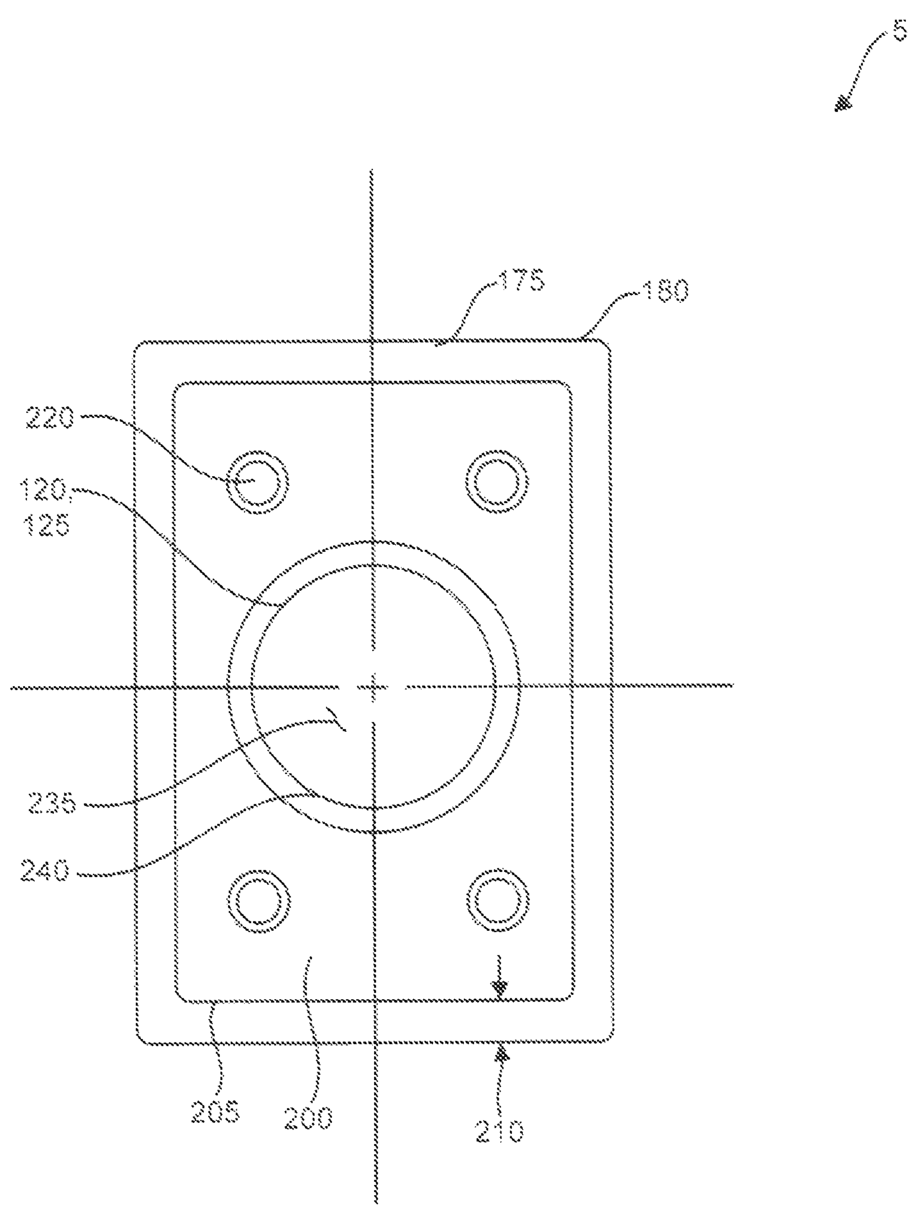
FIG. 7 shows a top view of the hand hold apparatus with only the second surrounding sidewall with the first and second planar flange elements, further shown is the base that is affixed to the second distal end portion, wherein the base provides a stop for the partial slidable engagement of the first surrounding sidewall.

FIG. 7 shows a top view of the hand hold apparatus 50 with only the second surrounding sidewall 120 with the first 175 and second 200 planar flange elements, further shown is the base 235 that is affixed 240 to the second distal end portion 140, wherein the base 235 provides a stop 255 for the partial slidable engagement 155 of the first surrounding sidewall 90.

Figure 8:
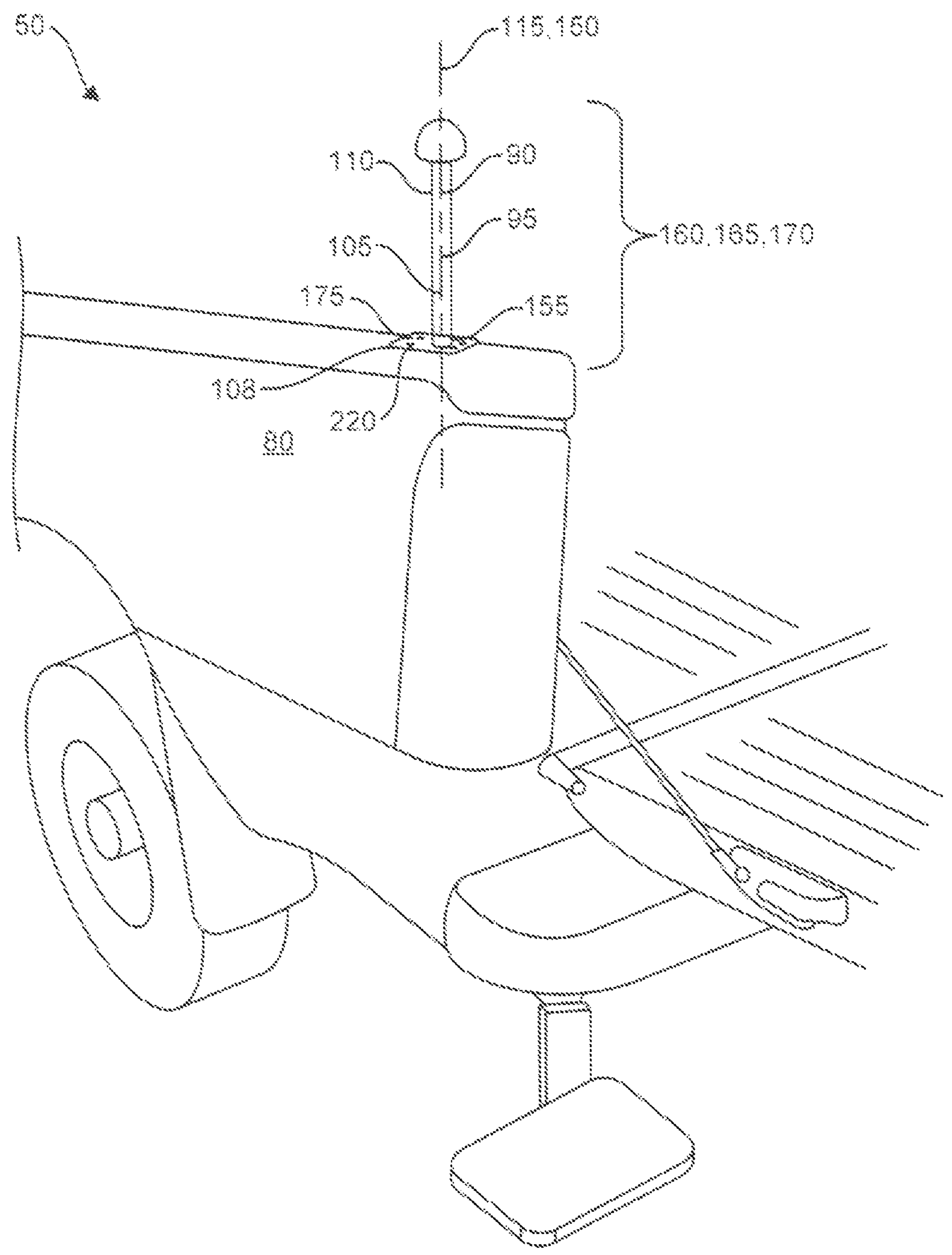
FIG. 8 shows an upper perspective view of the hand hold apparatus installed on a pickup truck with only the first surrounding sidewall projecting from the truck bed with the first planar flange element shown as being affixed to the truck bed.

FIG. 8 shows an upper perspective view of the hand hold apparatus 50 installed on the pickup truck with only the first surrounding sidewall 90 projecting 170 from the truck bed 80 with the first planar flange element 175 shown as being affixed 220 to the truck bed 80.

Figure 9:
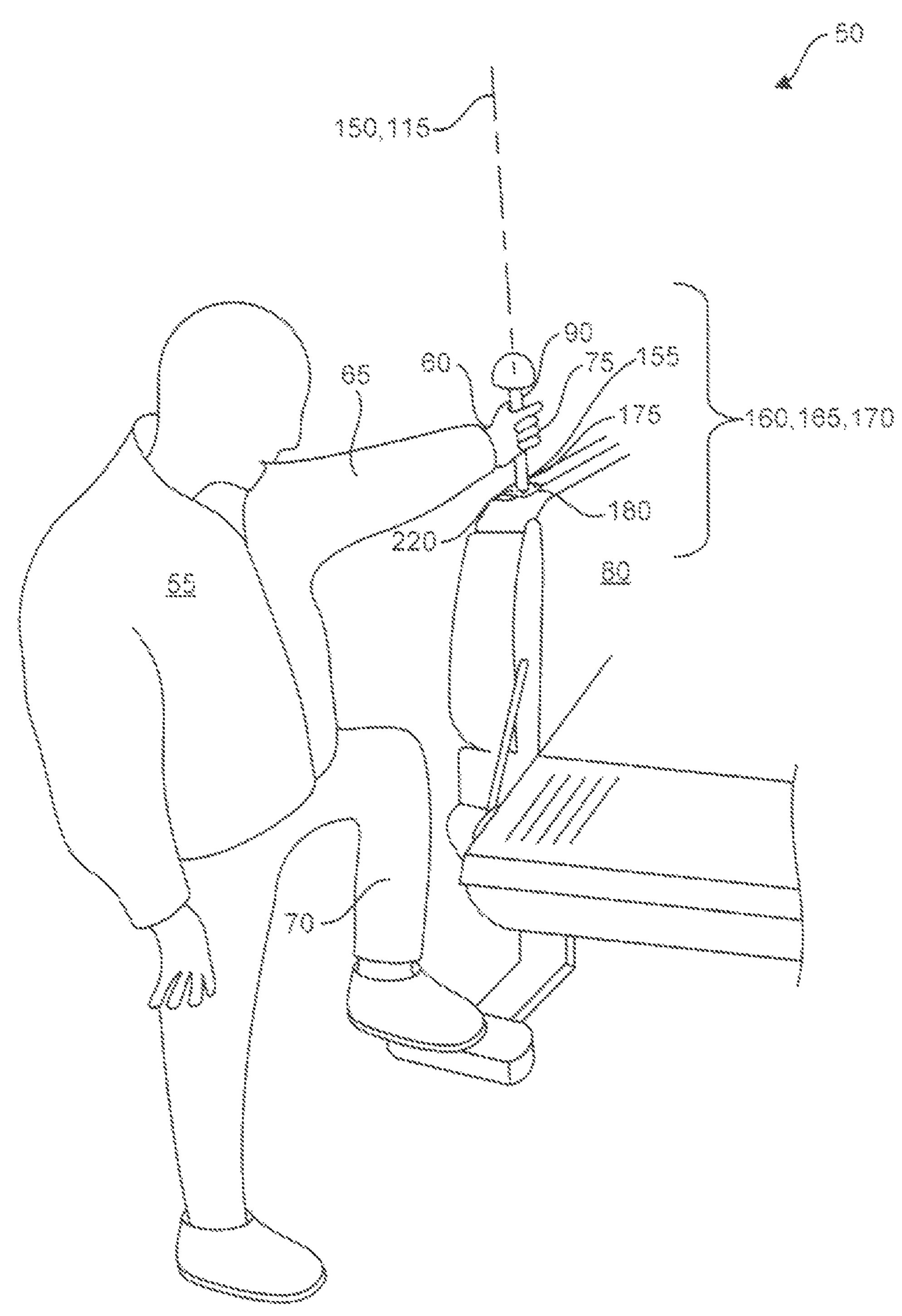
FIG. 9 shows an upper perspective view of the hand hold apparatus installed on the pickup truck in use by the user starting with their step-up to the truck bed with only the first surrounding sidewall projecting from the truck bed with the first planar flange element shown as being affixed to the truck bed.

FIG. 9 shows an upper perspective view of the hand hold apparatus 50 installed on the pickup truck in use by the user 55 starting with their step-up to the truck bed 80 with only the first surrounding sidewall 90 projecting 170 from the truck bed 80 with the first planar flange 175 element shown as being affixed 220 to the truck bed 80.

Figure 10:
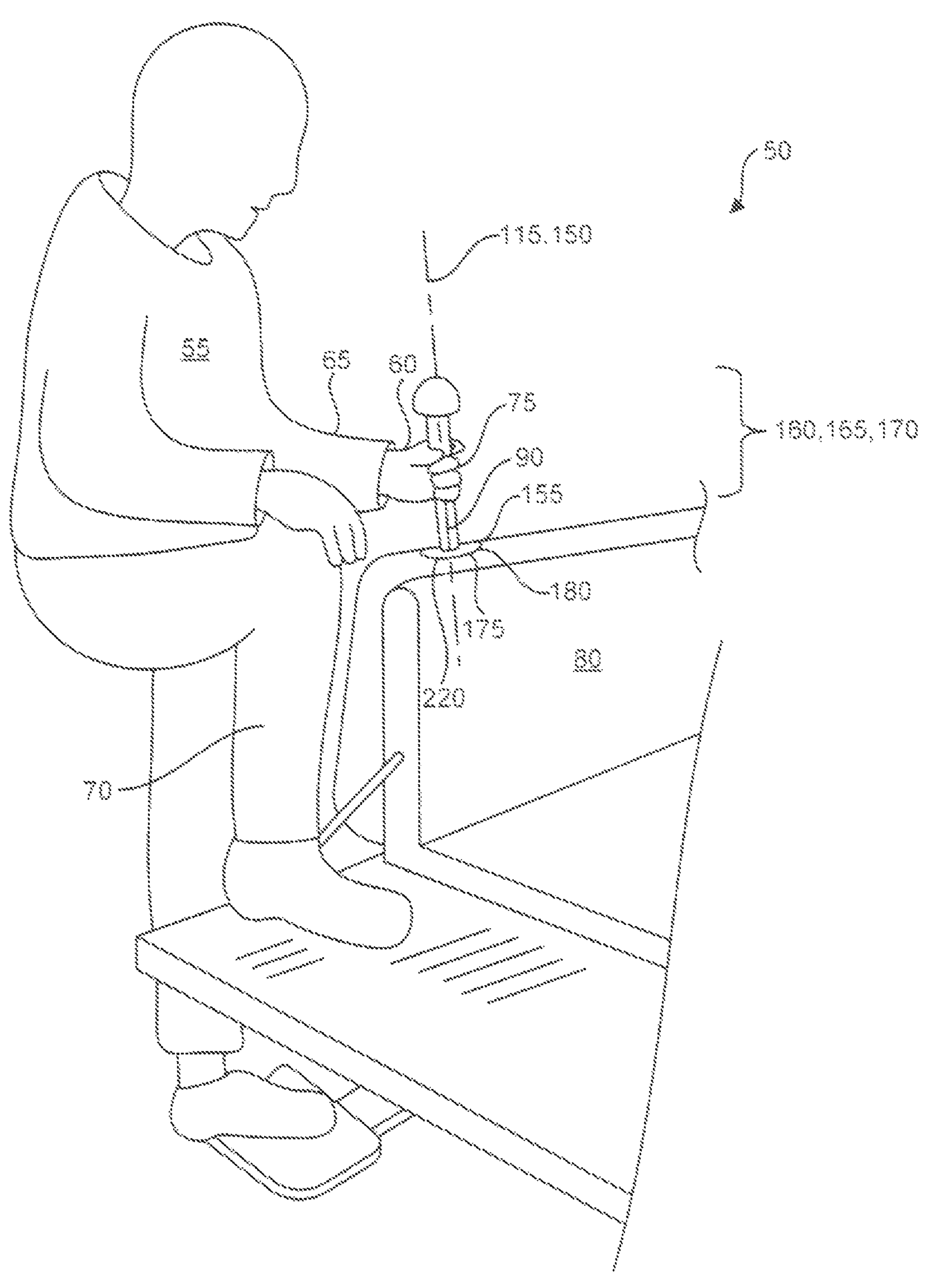
FIG. 10 shows an upper perspective view of the hand hold apparatus installed on the pickup truck in use by the user continuing with their step-up to the truck bed with only the first surrounding sidewall projecting from the truck bed with the first planar flange element shown as being affixed to the truck bed.

FIG. 10 shows an upper perspective view of the hand hold apparatus 50 installed on the pickup truck in use by the user 55 continuing with their step-up to the truck bed 80 with only the first surrounding sidewall 90 projecting 170 from the truck bed 80 with the first planar flange element 175 shown as being affixed 220 to the truck bed 80.

Figure 11:
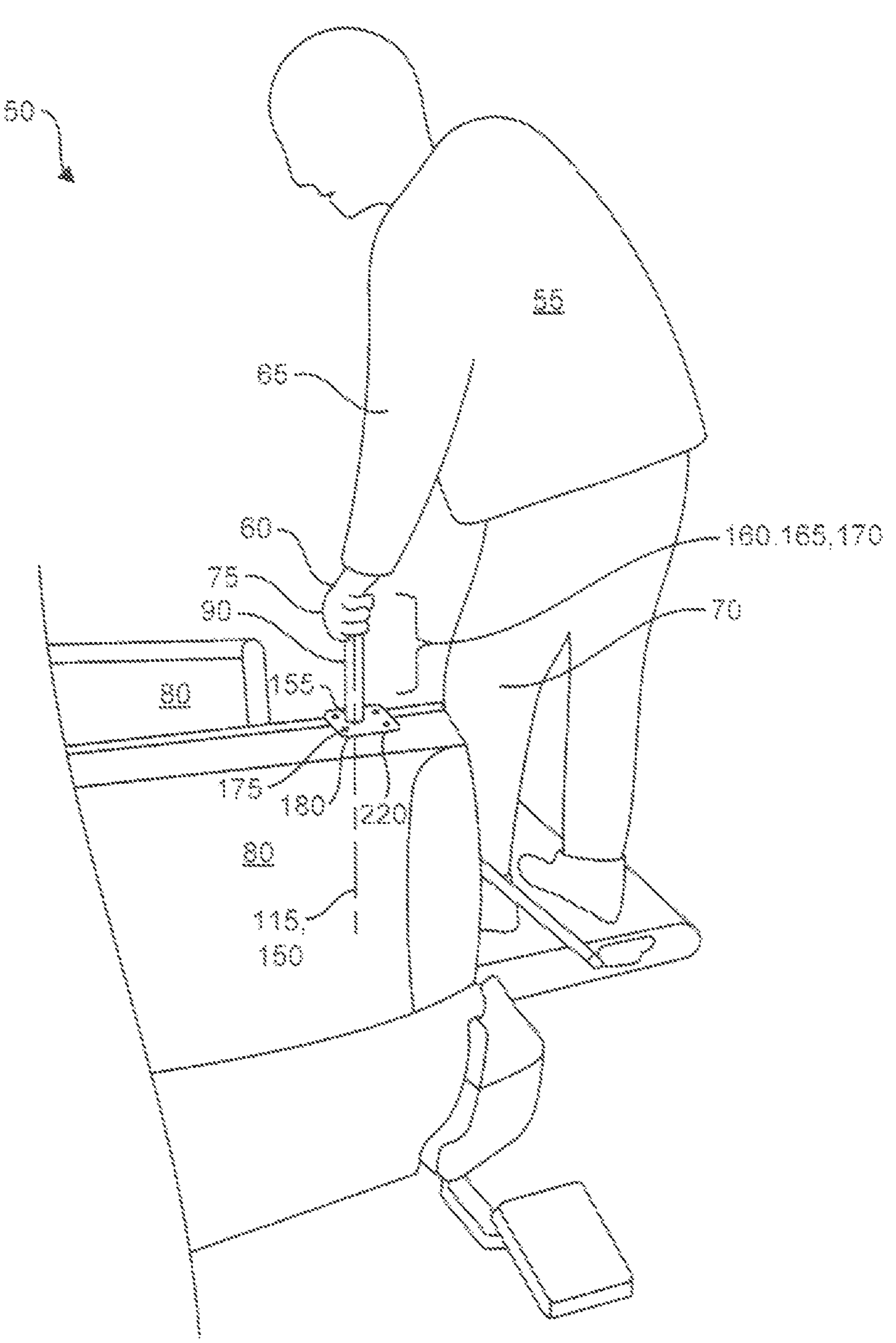
FIG. 11 shows an upper perspective view of the hand hold apparatus installed on the pickup truck in use by the user completing with their step-up to the truck bed with only the first surrounding sidewall projecting from the truck bed with the first planar flange element shown as being affixed to the truck bed.

FIG. 11 shows an upper perspective view of the hand hold apparatus 50 installed on the pickup truck in use by the user 55 completing with their step-up to the truck bed 80 with only the first surrounding sidewall 90 projecting 170 from the truck bed 80 with the first planar flange element 175 shown as being affixed 220 to the truck bed 80.

Figure 12:
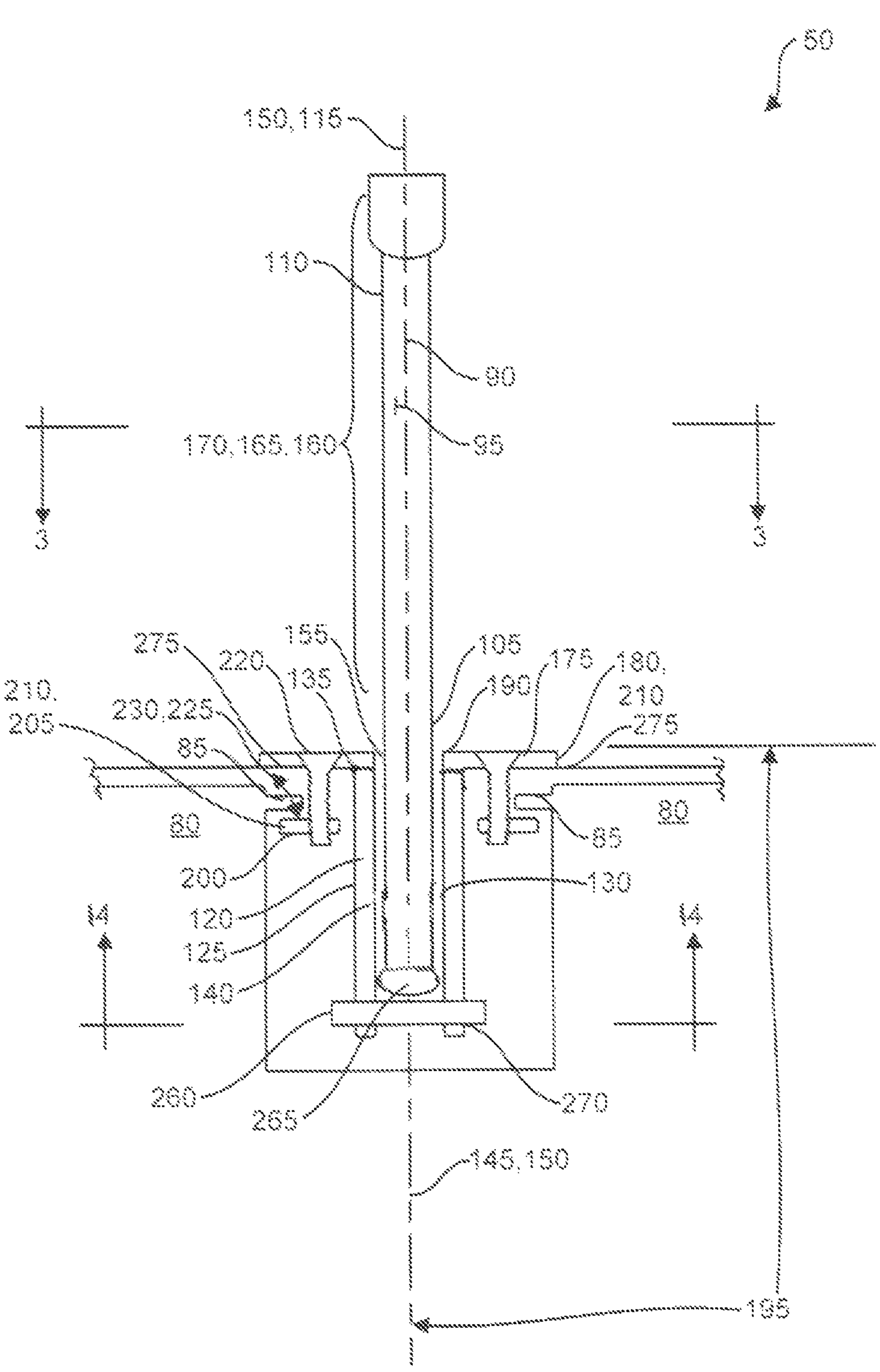
FIG. 12 shows a side elevation view of the hand hold apparatus with the first and second surrounding sidewalls with the first surrounding sidewall slidably engaged within the second surrounding sidewall along with the first and second planar flange elements sandwiching the truck bed with an alternative embodiment of the pin disposed through apertures in the second distal end portion, wherein the pin provides a stop for the partial slidable engagement of the first surrounding sidewall.

FIG. 12 shows a side elevation view of the hand hold apparatus 50 with the first 90 and second 120 surrounding sidewalls with the first surrounding sidewall 90 slidably engaged 155 within the second surrounding sidewall 120 along with the first 175 and second 200 planar flange elements sandwiching 220 the truck bed 80 with an alternative embodiment of the pin 260 disposed through apertures 270 in the second distal end portion 140, wherein the pin 260 provides a stop 265 for the partial slidable engagement 155 of the first surrounding sidewall 90.

Figure 13:
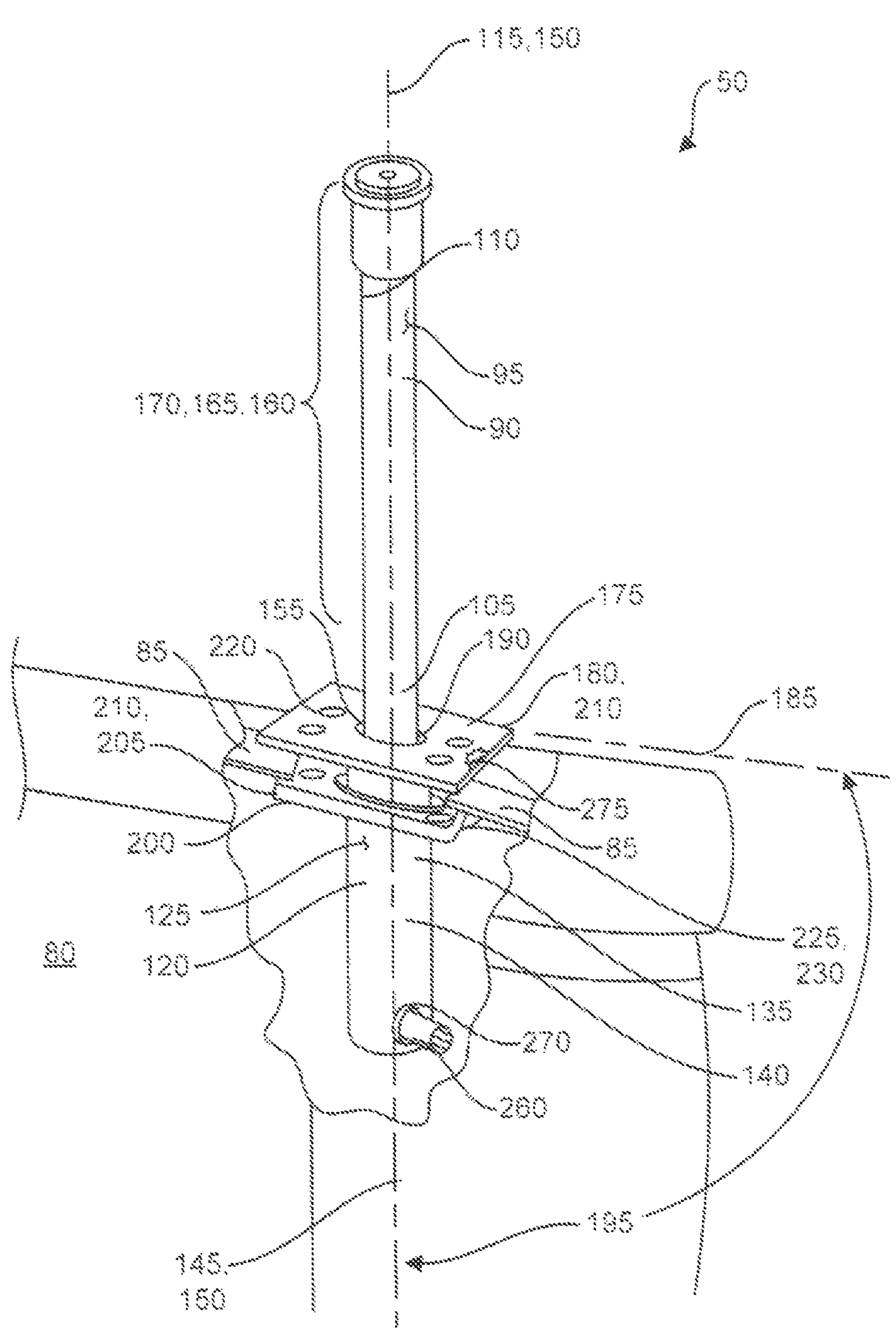
FIG. 13 shows an upper perspective view of the hand hold apparatus with the first and second surrounding sidewalls with the first surrounding sidewall slidably engaged within the second surrounding sidewall along with the first and second planar flange elements sandwiching the truck bed with the alternative embodiment of the pin disposed through apertures in the second distal end portion, wherein the pin provides a stop for the partial slidable engagement of the first surrounding sidewall.

FIG. 13 shows an upper perspective view of the hand hold apparatus 50 with the first 90 and second 120 surrounding sidewalls with the first surrounding sidewall 90 slidably engaged 155 within the second surrounding sidewall 120 along with the first 175 and second 200 planar flange elements sandwiching 220 the truck bed 80 with the alternative embodiment of the pin 260 disposed through apertures 270 in the second distal end portion 140, wherein the pin 260 provides a stop 265 for the partial slidable engagement 155 of the first surrounding sidewall 90.

Figure 14:
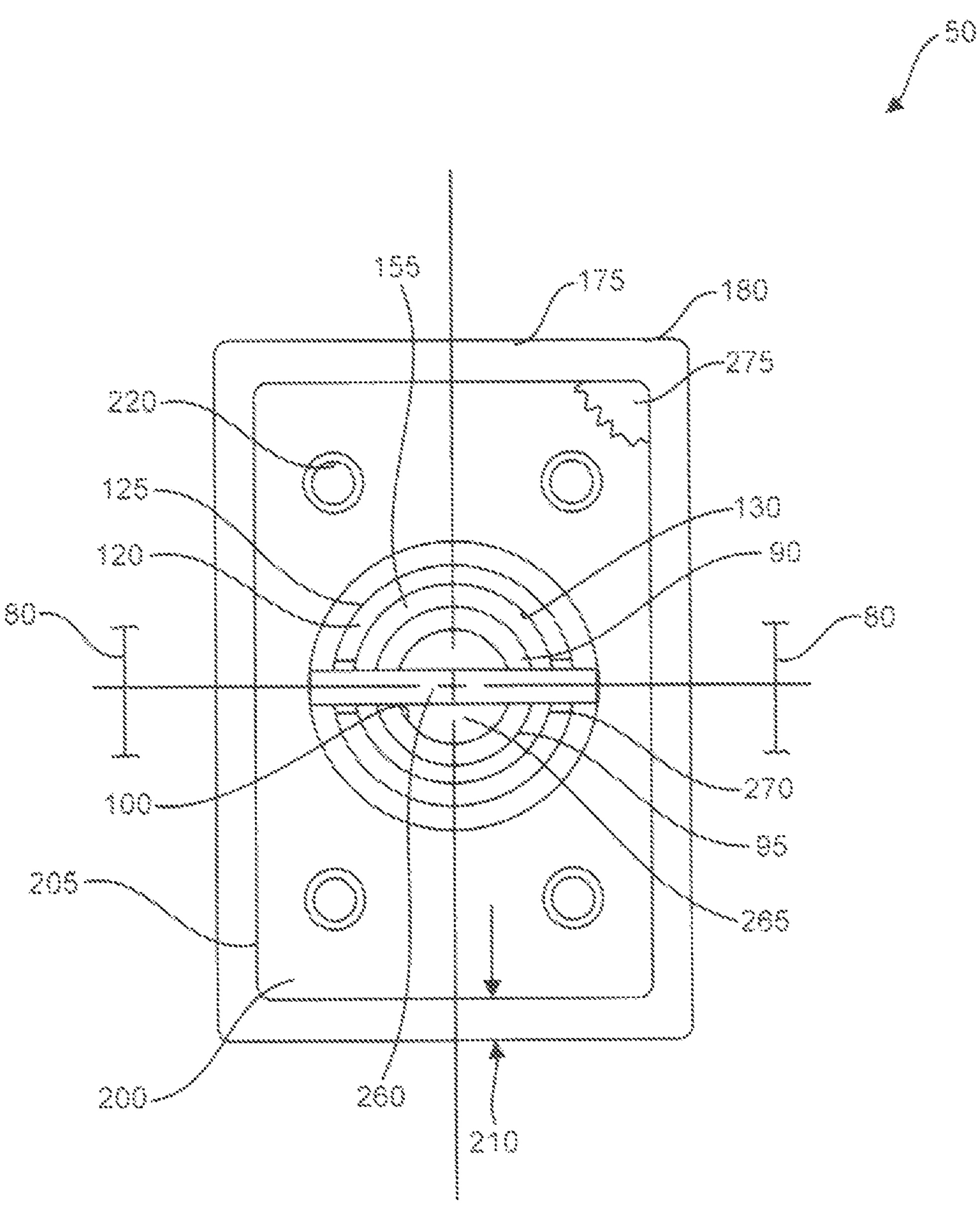
FIG. 14 shows a bottom view of the hand hold apparatus with the first and second surrounding sidewalls with the first surrounding sidewall slidably engaged within the second surrounding sidewall along with the first and second planar flange elements sandwiching the truck bed with the alternative embodiment of the pin disposed through apertures in the second distal end portion, wherein the pin provides a stop for the partial slidable engagement of the first surrounding sidewall.

FIG. 14 shows a bottom view of the hand hold apparatus 50 with the first 90 and second 120 surrounding sidewalls with the first surrounding sidewall 90 slidably engaged 155 within the second surrounding sidewall 120 along with the first 175 and second 200 planar flange elements sandwiching 220 the truck bed 80 with the alternative embodiment of the pin 260 disposed through apertures 270 in the second distal end portion 140, wherein the pin 260 provides a stop 265 or the partial slidable engagement 155 of the first surrounding sidewall 90.

Figure 15:
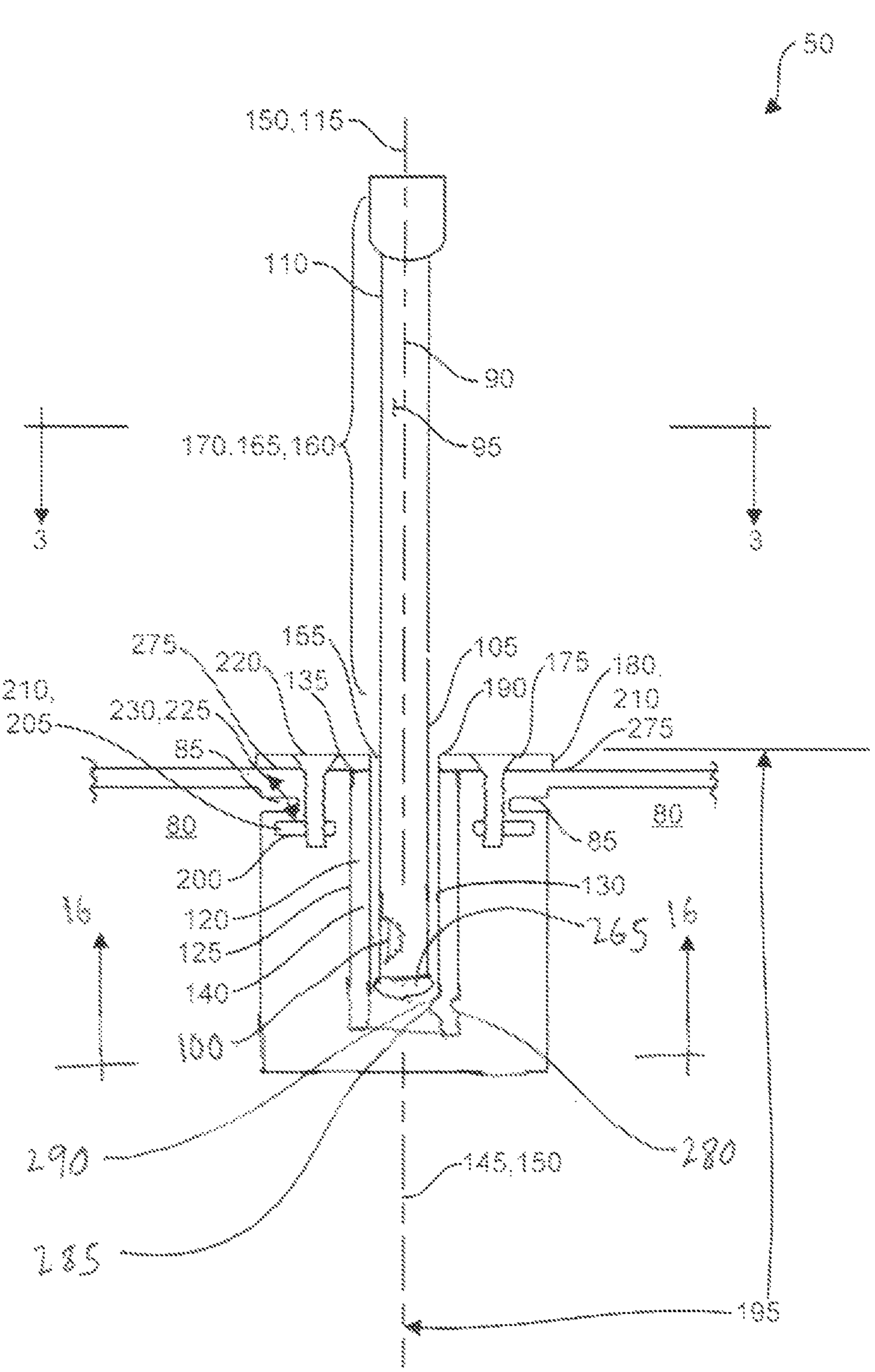
FIG. 15 shows a side elevation view of the hand hold apparatus with the first and second surrounding sidewalls with the first surrounding sidewall slidably engaged within the second surrounding sidewall along with the first and second planar flange elements sandwiching the truck bed, further shown is a dimple with the indentation and protrusion that is disposed in the second distal end portion, wherein the dimple protrusion provides a stop at the interface of the stop cushion and the dimple protrusion for the partial slidable engagement of the first surrounding sidewall.

FIG. 15 shows a side elevation view of the hand hold apparatus 50 with the first 90 and second 120 surrounding sidewalls with the first surrounding sidewall 90 slidably engaged 155 within the second surrounding sidewall 120 along with the first 175 and second 200 planar flange elements sandwiching 220 the truck bed 80, further shown is a dimple with the indentation 280 and protrusion 285 that is disposed in the second distal end portion 140, wherein the dimple protrusion 285 provides a stop at the interface 290 of the stop cushion 265 and the dimple protrusion 285 for the partial slidable engagement 155 of the first surrounding sidewall 90.

Figure 16:
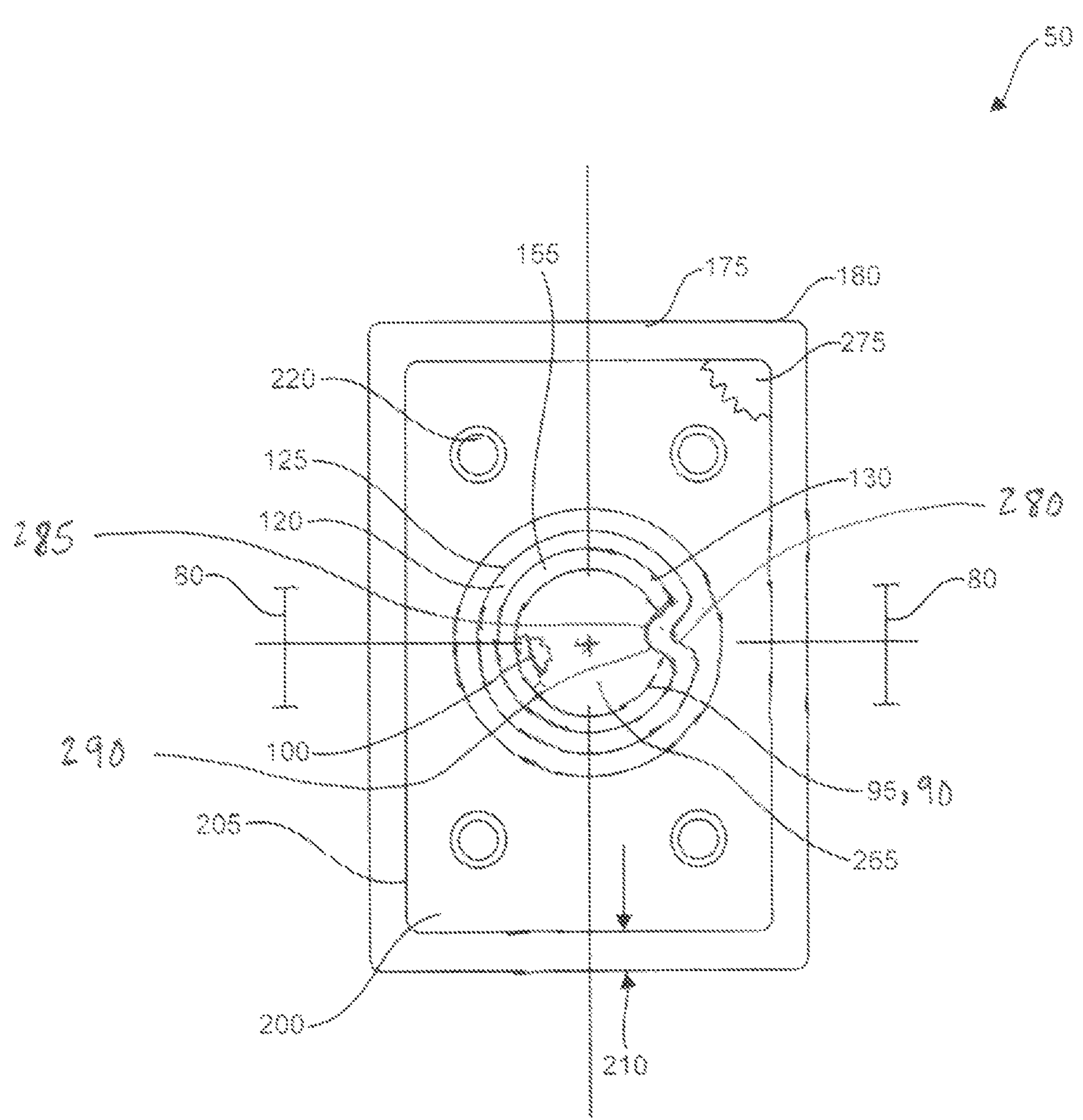
FIG. 16 shows a bottom view of the hand hold apparatus with the first and second surrounding sidewalls with the first surrounding sidewall slidably engaged within the second surrounding sidewall along with the first and second planar flange elements, further shown is the dimple with the indentation and protrusion that is disposed in the second distal end portion, wherein the dimple protrusion provides a stop at the interface of the stop cushion and the dimple protrusion for the partial slidable engagement of the first surrounding sidewall.

FIG. 16 shows a bottom view of the hand hold apparatus 50 with the first 90 and second 120 surrounding sidewalls with the first surrounding sidewall 90 slidably engaged 155 within the second surrounding sidewall 120 along with the first 175 and second 200 planar flange elements, further shown is the dimple with the indentation 280 and protrusion 285 that is disposed in the second distal end portion 140, wherein the dimple protrusion 285 provides a stop at the interface 290 of the stop cushion 265 and the dimple protrusion 285 for the partial slidable engagement 155 of the first surrounding sidewall 90.

Broadly in looking at FIGS. 1 to 16, the present invention is the hand hold apparatus 50 for manually grasping by a user 55 or support in the truck bed 80 wherein the truck bed 80 has the protrusion 85, the hand hold apparatus 50 including the first surrounding sidewall 90 including the first outer surface 95 and the opposing first inner surface 100, further the first surrounding sidewall 90 having the first proximal end portion 105 and the opposing first distal end portion 110 with a first longitudinal axis 115 spanning therebetween.

Further included in the hand hold apparatus 50 is the second surrounding sidewall 120 including the second outer surface 125 and the opposing second inner surface 130, further the second surrounding sidewall 120 having the second proximal end portion 135 and the opposing second distal end portion 140 with the second longwise axis 145 spanning therebetween. Wherein the first longitudinal axis 115 and the second longwise axis 145 are coincident 150 to one another and the first outer surface 95 has the partial slidable engagement 155 with the second inner surface 130 being along both the first longitudinal axis 115 and the second longwise axis 145 with a portion of the first surrounding sidewall 90 first outer surface 95 of the first distal end portion 110 telescopically projecting 160 in a cantilever manner 165 the distance 170 beyond the second proximal end portion 135.

In addition, the hand hold apparatus 50 includes the first planar flange element 175 with the first outer periphery 180, the first planar element 175 having the first plane 185, the first planar element 175 is affixed 190 to the second proximal end portion 135 such that the first plane 185 and the second longwise axis 145 are perpendicular 195 to one another. The second planar flange element 200 with the second outer periphery 205, wherein the second outer periphery 205 is less than the first outer periphery 180 and the plurality of threaded fasteners that are received therein 220 for removably engageable fastening between the first 175 and second 200 planar flange elements. Wherein operationally, the first 175 and second 200 planar flange elements clamp 225 upon the truck bed protrusion 85 via the plurality of threaded fasteners that are received therein 220 for removably engageable fastening such that the first 175 and second 200 flange elements clamp 225 on the protrusion 85 that secures the first 90 and second 120 surrounding sidewalls to the truck bed 80.

Optional for the hand hold apparatus 50, the second distal end portion 140 can further comprise an aperture 270 disposed therethrough the second surrounding sidewall 120 from the second outer surface 125 to the second inner surface 130, wherein a pin 260 is disposed therethrough and supported by the aperture 270, wherein a portion of the pin 260 has a pin projection past the second inner surface 130 toward the second longwise axis 145 such that operationally the pin 260 projection acts as a stop as against the first proximal end portion 105 along the first longitudinal axis 115 in a direction opposite from the first distal end portion 110, see in particular FIGS. 12, 13, and 14.

Another option for the hand hold apparatus 50, is wherein the first proximal end portion 105 can further comprise a stop cushion 265 element that is disposed between the first proximal end portion 105 and the pin 260 projection to operationally dampen the first proximal end portion 105 contacting the pin 260 projection, see in particular FIGS. 12 and 14.

A further option for the hand hold apparatus 50, wherein the first proximal end portion 105 can further comprise a stop cushion element 265 that is disposed between the first proximal end portion 105 and the base 235 to operationally dampen the first proximal end portion 105 contacting the base 235, see in particular FIGS. 5, 6, and 7.

Looking at FIGS. 15 and 16, an alternative embodiment is disclosed for the hand hold apparatus 50 that is for manually grasping by the user 55 for support in the truck bed 80 wherein the truck bed 80 has a truck bed protrusion 85, the hand hold apparatus 50 includes the first surrounding sidewall 90 with the first outer surface 95 and the opposing first inner surface 100, further the first surrounding sidewall 90 having the first proximal end portion 105 and the opposing first distal end portion 110 with the first longitudinal axis 115 spanning therebetween.

Also included in the alternative embodiment is disclosed for the hand hold apparatus 50 is the second surrounding sidewall 120 including the second outer surface 125 and the opposing second inner surface 130, further the second surrounding sidewall 120 has a second proximal end portion 135 and the opposing second distal end portion 140 with the second longwise axis 145 spanning therebetween. Wherein the first longitudinal axis 115 and the second longwise axis 145 are coincident 150 to one another and the first outer surface 95 has a partial slidable engagement 155 with the second inner surface 130 being along both the first longitudinal axis 115 and the second longwise axis 145 with a portion 170 of the first surrounding sidewall 90 first outer surface 95 of the first distal end portion 110 telescopically projecting 160 in a cantilever manner 165 a distance beyond the second proximal end portion 135.

Wherein the second distal end portion 140 further includes a dimple that is radially disposed from the second outer surface 125 to the second inner surface 130 such that a dimple indentation 280 is disposed on the second outer surface 125 and a dimple protrusion 285 is disposed on the second inner surface 130. Wherein operationally the dimple protrusion 285 acts as a stop as against the first proximal end portion 105 along the first longitudinal axis 115 in a direction opposite from the first distal end portion 110, see in particular FIGS. 15 and 16.

Additionally included in the alternative embodiment is disclosed for the hand hold apparatus 50, is the first planar flange element 175 with the first outer periphery 180, the first planar element 175 having the first plane 185, the first planar element 175 is affixed 190 to the second proximal end portion 135 such that the first plane 185 and the second longwise axis 145 are perpendicular 195 to one another. Further included is the second planar flange element 200 with the second outer periphery 205, wherein the second outer periphery 205 is less than the first outer periphery 180. Also included is the plurality of threaded fasteners that are received therein 220 for removably engageable fastening between the first 175 and second 200 planar flange elements, wherein operationally the first 175 and second 200 planar flange elements clamp upon the truck bed protrusion 85 via the plurality of threaded fasteners that are received therein 220 for removably engageable fastening such that the first 175 and second 200 flange elements clamp on the truck bed protrusion 85 the secures said first 90 and second 120 surrounding sidewalls to the truck bed 80, see FIGS. 5 to 13 and FIGS. 15 and 16.

As an option for the hand hold apparatus 50, wherein the first proximal end portion 105 can further comprise the stop cushion element 265 that is disposed between the first proximal end portion 105 and the dimple protrusion 285 to operationally dampen the first proximal end portion 105 contacting interference 290 to the dimple protrusion 285, see in particular FIGS. 15 and 16.

CONCLUSION

Accordingly, the present invention of a hand hold apparatus has been described with some degree of particularity directed to the embodiments of the present invention. It should be appreciated, though; that the present invention is defined by the following claims construed in light of the prior art so modifications of the changes may be made to the exemplary embodiments of the present invention without departing from the inventive concepts contained therein.

The invention claimed is:

1. A hand hold apparatus for manually grasping by a user for support in a truck bed wherein the truck bed has a protrusion, said hand hold apparatus comprising:

(a) a first surrounding sidewall including a first outer surface and an opposing first inner surface, further said first surrounding sidewall having a first proximal end portion and an opposing first distal end portion with a first longitudinal axis spanning therebetween;

(b) a second surrounding sidewall including an second outer surface and an opposing second inner surface, further said second surrounding sidewall having a second proximal end portion and an opposing second distal end portion with a second longwise axis spanning therebetween, wherein said first longitudinal axis and said second longwise axis are coincident to one another and said first outer surface has a partial slidable engagement with said second inner surface being along both said first longitudinal axis and said second longwise axis with a portion of said first surrounding sidewall first outer surface of said first distal end portion telescopically projecting in a cantilever manner a distance beyond said second proximal end portion;

(c) a first planar flange element with a first outer periphery, said first planar element having a first plane, said first planar element is affixed to said second proximal end portion such that said first plane and said second longwise axis are perpendicular to one another;

(d) a second planar flange element with second outer periphery, wherein said second outer periphery is less than said first outer periphery; and (e) a plurality of threaded fasteners for removably engageable fastening between said first and second planar flange elements, wherein operationally said first and second planar flange elements clamp upon the truck bed protrusion via said plurality of threaded fasteners for removably engageable fastening such that said first and second flange elements clamp on the truck bed protrusion that secures said first and second surrounding sidewalls to the truck bed.

2. A hand hold apparatus according to claim 1 wherein said second distal end portion further comprises an aperture disposed therethrough said second surrounding sidewall from said second outer surface to said second inner surface, wherein a pin is disposed therethrough and supported by said aperture, wherein a portion of said pin has a pin projection past said second inner surface toward said second longwise axis such that operationally said pin projection acts as a stop as against said first proximal end portion along said first longitudinal axis in a direction opposite from said first distal end portion.

3. A hand hold apparatus according to claim 2 wherein said first proximal end portion further comprises a stop cushion element that is disposed between said first proximal end portion and said pin projection to operationally dampen said first proximal end portion contacting said pin projection.

4. A hand hold apparatus for manually grasping by a user for support in a truck bed wherein the truck bed has a protrusion, said hand hold apparatus comprising:

(a) a first surrounding sidewall including a first outer surface and an opposing first inner surface, further said first surrounding sidewall having a first proximal end portion and an opposing first distal end portion with a first longitudinal axis spanning therebetween;

(b) a second surrounding sidewall including an second outer surface and an opposing second inner surface, further said second surrounding sidewall having a second proximal end portion and an opposing second distal end portion with a second longwise axis spanning therebetween, wherein said first longitudinal axis and said second longwise axis are coincident to one another and said first outer surface has a partial slidable engagement with said second inner surface being along both said first longitudinal axis and said second longwise axis with a portion of said first surrounding sidewall first outer surface of said first distal end portion telescopically projecting in a cantilever manner a distance beyond said second proximal end portion;

(c) a base affixed to said second distal end portion, wherein said base and said second inner surface define a second surrounding sidewall interior, wherein said base is operational to be a stop for said first surrounding sidewall along both said first longitudinal axis and said second longwise axis for said partial slidable engagement;

(d) a first planar flange element with a first outer periphery, said first planar element having a first plane, said first planar element is affixed to said second proximal end portion such that said first plane and said second longwise axis are perpendicular to one another;

(e) a second planar flange element with second outer periphery, wherein said second outer periphery is less than said first outer periphery; and (f) a plurality of threaded fasteners for removably engageable fastening between said first and second planar flange elements, wherein operationally said first and second planar flange elements clamp upon the truck bed protrusion via said plurality of threaded fasteners for removably engageable fastening such that said first and second flange elements clamp on the truck bed protrusion that secures said first and second surrounding sidewalls to the truck bed.

5. A hand hold apparatus according to claim 4 wherein said first proximal end portion further comprises a stop cushion element that is disposed between said first proximal end portion and said base to operationally dampen said first proximal end portion contacting said base.

6. A hand hold apparatus for manually grasping by a user for support in a truck bed wherein the truck bed has a protrusion, said hand hold apparatus comprising:

(a) a first surrounding sidewall including a first outer surface and an opposing first inner surface, further said first surrounding sidewall having a first proximal end portion and an opposing first distal end portion with a first longitudinal axis spanning therebetween;

(b) a second surrounding sidewall including an second outer surface and an opposing second inner surface, further said second surrounding sidewall having a second proximal end portion and an opposing second distal end portion with a second longwise axis spanning therebetween, wherein said first longitudinal axis and said second longwise axis are coincident to one another and said first outer surface has a partial slidable engagement with said second inner surface being along both said first longitudinal axis and said second longwise axis with a portion of said first surrounding sidewall first outer surface of said first distal end portion telescopically projecting in a cantilever manner a distance beyond said second proximal end portion, wherein said second distal end portion further includes a dimple that is radially disposed from said second outer surface to said second inner surface such that a dimple indentation is disposed on said second outer surface and a dimple protrusion is disposed on said second inner surface, wherein operationally said dimple protrusion acts as a stop as against said first proximal end portion along said first longitudinal axis in a direction opposite from said first distal end portion;

(c) a first planar flange element with a first outer periphery, said first planar element having a first plane, said first planar element is affixed to said second proximal end portion such that said first plane and said second longwise axis are perpendicular to one another;

(d) a second planar flange element with second outer periphery, wherein said second outer periphery is less than said first outer periphery; and (e) a plurality of threaded fasteners for removably engageable fastening between said first and second planar flange elements, wherein operationally said first and second planar flange elements clamp upon the truck bed protrusion via said plurality of threaded fasteners for removably engageable fastening such that said first and second flange elements clamp on the truck bed protrusion the secures said first and second surrounding sidewalls to the truck bed.

7. A hand hold apparatus according to claim 6 wherein said first proximal end portion further comprises a stop cushion element that is disposed between said first proximal end portion and said dimple protrusion to operationally dampen said first proximal end portion contacting said dimple protrusion.

* * * * *